(12) United States Patent
Daunheimer (10) Patent No.: US 9,884,375 B2
(45) Date of Patent: Feb. 6, 2018

(54) METHOD AND DEVICE FOR PRODUCING A CAVITY IN A STATOR OF AN ECCENTRIC SCREW PUMP

(71) Applicant: Ralf Daunheimer, Schermbeck (DE)

(72) Inventor: Ralf Daunheimer, Schermbeck (DE)

( * ) Notice: Subject to any disclaimer, the term of this patent is extended or adjusted under 35 U.S.C. 154(b) by 0 days.

(21) Appl. No.: 14/907,044

(22) PCT Filed: Jul. 17, 2014

(86) PCT No.: PCT/EP2014/065458
§ 371 (c)(1),
(2) Date: Jan. 22, 2016

(87) PCT Pub. No.: WO2015/011030
PCT Pub. Date: Jan. 29, 2015

(65) Prior Publication Data
US 2016/0158852 A1 Jun. 9, 2016

(30) Foreign Application Priority Data
Jul. 23, 2013 (DE) .................. 10 2013 107 884

(51) Int. Cl.
B23C 3/32 (2006.01)
(52) U.S. Cl.
CPC .......... *B23C 3/32* (2013.01); *B23C 2220/363* (2013.01); *B23C 2265/12* (2013.01);
(Continued)
(58) Field of Classification Search
CPC .......... B23C 2220/363; B23C 2220/24; B23C 2265/12; B23C 3/32; B23C 3/02;
(Continued)

(56) References Cited

U.S. PATENT DOCUMENTS 2,189,867 A 2/1940 Hagerman
4,813,828 A * 3/1989 Beck .................. B23B 51/0036
409/132
(Continued)

FOREIGN PATENT DOCUMENTS

CN 201848585 U 6/2011
DE 1942050 A1 5/1970
(Continued)

*Primary Examiner* — Daniel Howell
*Assistant Examiner* — Nicole N Ramos
(74) *Attorney, Agent, or Firm* — Karl F. Milde, Jr.; Eckert Seamans Cherin & Mellott, LLC (57) ABSTRACT

In a method for producing a cavity (14) in a stator of an eccentric screw pump, material is removed in the interior of a stator blank (10) by means of a tool (11). In order that very long stators can be produced in one production operation, the tool (11) performs a rotational motion through a first shaft (12) and an eccentric motion around a second shaft (13), during which the stator blank (10) and the tool (11) are moved toward each other. A device for performing the method comprises (a) a bearing shaft (3) that can be coupled with its drive end to a first drive and that is rotatable around its longitudinal axis by means of the first drive; (b) a drive shaft (4) that can be coupled with its drive end to a second drive and is arranged in a borehole of the bearing shaft (3) and is rotatable around its longitudinal axis by means of the second drive form-fitting and relative to the bearing shaft (3), and (c) a machining tool (5), which is rotationally fixed connected to the machining end of the drive shaft (4) that can be inserted into the cavity and can be driven rotatably via the drive shaft (4) around the longitudinal axis of the drive shaft (4). The longitudinal axis of the drive shaft (4) intersects the longitudinal axis of the bearing shaft (3) at a point or is arranged askew to the longitudinal axis of the bearing shaft (3).

10 Claims, 11 Drawing Sheets

(52) U.S. Cl.
CPC ............ *Y10T 409/300112* (2015.01); *Y10T 409/303808* (2015.01); *Y10T 409/304424* (2015.01)

(58) Field of Classification Search
CPC .. B23C 3/04; B23C 3/002; B23C 3/16; B23C 3/186; B23C 2270/186; Y10T 409/300056; Y10T 409/300112; Y10T 409/300392; Y10T 409/300616; Y10T 409/300672; Y10T 409/300784; Y10T 409/307616; Y10T 409/30756; Y10T 409/303752; Y10T 409/303808; Y10T 409/304424
See application file for complete search history.

(56) References Cited

U.S. PATENT DOCUMENTS

| | | | | |
|---|---|---|---|---|
| 5,150,518 A | * | 9/1992 | Fuchs | B23B 5/46 29/557 |
| 7,478,982 B2 | * | 1/2009 | Fuhst | B23D 21/14 166/55.7 |
| 8,256,092 B1 | * | 9/2012 | Woodruff | B23B 41/12 29/557 |
| 2003/0102139 A1 | | 6/2003 | Debat et al. | |
| 2012/0294687 A1 | * | 11/2012 | Wilmot | B23C 3/32 409/132 |

FOREIGN PATENT DOCUMENTS

| | | | | |
|---|---|---|---|---|
| DE | 2430620 A1 | * | 2/1975 | ............ B23Q 1/54 |
| DE | 3723133 C1 | | 7/1988 | |
| DE | 3724023 A1 | | 2/1989 | |
| EA | 005327 A1 | | 6/2004 | |
| EP | 0451131 A2 | | 10/1991 | |
| EP | 0919333 A1 | * | 6/1999 | ............ B23Q 1/25 |
| JP | 58132407 A | * | 8/1983 | ............ B23C 3/34 |
| SU | 931326 A1 | * | 5/1982 | ............ B23Q 1/54 |
| WO | 2011095823 A1 | | 8/2011 | |

* cited by examiner

METHOD AND DEVICE FOR PRODUCING A CAVITY IN A STATOR OF AN ECCENTRIC SCREW PUMP

BACKGROUND OF THE INVENTION

The invention relates to a method for producing a cavity in a stator of an eccentric screw pump, wherein material is removed with a tool on the inside of a stator blank.

The invention also relates to a device for carrying out the method.

Methods of the type stated above are known from the prior art.

Eccentric screw pumps are used for, among other things, continuously conveying viscous fluids. They have a stator and therein rotatably supported a rotor that is helically wound such that when producing a stator for an eccentric screw pump, a helically wound cavity with a respective interior wall structure is worked into the stator blank.

A conventional method for producing a stator provides that initially a stator blank is prepared, which is then machined, for example, to form a desired interior wall structure. Machining becomes increasingly difficult as the axial length of the stator to be produced increases, in particular because conventional machining devices are not able to absorb the transverse forces that occur during the machining process without an elastic deformation of the machining device occurring perpendicular to its longitudinal extent. Precise machining of stator blanks is thus not always ensured because of this deformation.

Other methods for producing stators for eccentric screw pumps are electrical or electrochemical removal processes such as electrical erosion or electrochemical erosion. In particular, stators made of metallic materials have been produced within the scope of these methods. However, additional heat is generated with electrochemical erosion causing an undesirable tapered borehole after cool-down.

A major disadvantage in connection with all conventional methods for producing a stator for an eccentric screw pump is that only relatively short stators can be produced, or that several stator segments must be combined for a sufficiently long stator, which in turn is cost-intensive and requires additional design effort.

SUMMARY OF THE INVENTION

The problem addressed by the present invention is, therefore, to improve on the methods referred to above to allow in the course of manufacturing for the production of a stator of a material such as Metal, plastic for example, and to provide, in theory, unlimited length.

The present invention provides that the tool carries out a rotating movement inside the stator blank through a first shaft as well as an eccentric movement around a second shaft, wherein the stator blank and the tool are moved against each other.

A fundamental idea of the invention is to form a cavity that corresponds to the eccentric movement of a rotor located in an eccentric screw pump through eccentric drilling. The fact that the tool is moved rotationally inside the stator by a first shaft, and the stator blank and the tool are moved against each other causes the tool to be guided continuously inside the stator blank and through which a continuous material removal occurs. The preferably multi-blade tool, having expediently four to five blades, carries out a stroke movement based on the feed.

In an eccentric screw pump, the rotor and the stator are preferably located in a steel sleeve. In this case, the rotor's axis of rotation is not the symmetry axis of the sleeve. Rather, the rotor rotates "eccentrically". The eccentric movement of the tool and the relative movement of the stator blank and the tool to each other form the cavity that corresponds to the eccentric movement of the rotor. Thus, the advantage of the invention is in particular that very long stators can be produced from a single piece of material by drilling.

An additional advantage of the invention is that the tool is through superimposition of at least two interacting shafts to carry out certain machining operations inside a stator blank. In this manner, a complex overall movement sequence required for machining can be divided into two less complex movements that are carried out by the interacting shafts. This allows for the use of relatively simple drive devices for driving the shafts. Furthermore, the method according to the invention allows the use of drive devices or drives that are designed less powerful, which is again a cost advantage compared to other production methods.

It has been found that the slope of the stator is created by a change of the speed ratio between the stator blank and the eccentric movement of the tool. One advantageous embodiment of the invention, therefore, provides for the stator blank to carry out a rotating movement. A rotating movement of the stator blank provides the prerequisite for setting a speed ratio between the stator and the eccentric movement of the tool.

A practicable variant of the invention provides the tool to carry out two complete eccentric movements during one full rotation of the stator blank. As a result of this speed ratio, hypocycloidal formations that can also include the screw contour typical for an eccentric screw pump can be created inside the stator blank in addition to the elongated hole.

Expediently, the movements are carried out inside a guide sleeve or a bearing shaft. Preferably, the guiding sleeve or the bearing shaft can rotate at that time.

To ensure a steady removal of the material inside the stator blank, another advantageous embodiment of the invention provides that the tool inside the stator blank is guided along the stator blank. The stator blank and/or the tool carrying out an axial feed movement preferably serve this purpose as well. The stator blank carrying out an axial feed movement also ensures that a symmetric axis is provided such that an eccentric movement of the tool can be carried out continuously.

Expediently, the first shaft and the second shaft as well as the guide sleeve or the bearing shaft run parallel to each other.

Advantageously, the eccentric rotation of the tool is driven by an eccentric shaft. However, it is also conceivable that the eccentric rotation of the tool is driven by a rotatable shaft that is arranged off-center of the stator blank's axis of symmetry.

For this purpose, specifically arranged drives can be provided for driving the first and second shaft.

Finally, the invention also provides for a device for carrying out the method. The device according to the invention comprises through a bearing shaft that can be coupled with its drive end to a first drive and that is rotatable around its longitudinal axis by means of the first drive, one drive shaft that can be coupled with its drive end to a second drive and is arranged in a borehole of the bearing shaft and is rotatable around its longitudinal axis by means of the second drive form-fitting and relative to the bearing shaft, and a machining tool, which is rotationally fixed connected to the machining end of the drive shaft that can be inserted into the cavity and can be driven rotatably via the drive shaft around the longitudinal axis of the drive shaft, wherein the longitudinal axis of the drive shaft intersects the longitudinal axis of the bearing shaft at a point or is arranged askew to the longitudinal axis of the bearing shaft.

For a full understanding of the present invention, reference should now be made to the following detailed description of the preferred embodiments of the invention as illustrated in the accompanying drawings.

DESCRIPTION OF THE PREFERRED EMBODIMENTS

The preferred embodiments of the present invention will now be described with reference to FIGS. 1-5b of the drawings. Identical elements in the various figures are designated with the same reference numerals.

In a sectional view, FIGS. 1a to 1d illustrate frames at certain moments of the tool's movement sequence inside the stator blank 20 for producing a stator for an eccentric screw pump.

For the production of the stator, a tool is provided that, in the embodiment of the invention shown in FIGS. 1a to 1d, is a milling tool that is designated with the reference number 11. Furthermore, a first shaft 12 is provided in the context of the method according to the invention by which the rotating milling tool 11 is driven inside the stator blank 20.

An additional movement of the tool 11 is in the form of an eccentric movement, namely around a second shaft 13 that does not coincide with the axis of symmetry of the stator blank 20. The stator blank 20 carries out additional movements, namely in the form of an axial feed movement and a rotating movement. Drives (not shown in FIGS. 1a to 1d) are provided for both the movements of the stator blank 20 and for the rotating movement of the milling tool 11 around the first shaft 12 as well as for the eccentric movement of the tool 11 around the second shaft 13.

The method begins with the stator blank 20 and the rotating milling tool 11 being moved against each other and at the same time the rotating tool 11 being driven inside the stator blank 20 through the first shaft 12 and carrying out the eccentric movement around the second shaft 13 (eccentric shaft). The initiated feed movement of the stator blank 20 causes the tool 11 to be guided inside the stator blank 20, which coincides with material removal inside the stator blank 20. In this way, a cavity 21 is formed inside the stator blank 20 having the cross-sectional shape of a longitudinal hole that is typical for an eccentric screw pump.

As FIGS. 1a to 1d further illustrate, the milling tool 11 carries out eccentric movements during the rotation of the stator blank 20. The given axial feed movement of the stator blank 20 also results in the helical cavity 21 that is typical for a stator of an eccentric screw pump and is reflected in the longitudinal holes shown in the cross-sectional views of FIGS. 1a to 1d.

The movements of the stator blank 20 and the tool 11 are coordinated to each other. At the beginning of the method, the milling tool 11 is centered, i.e., in the center of the guide tube 15 and the stator blank 20. A 90° rotation of the tool 11 carried out in the context of the eccentric movement leads to the stator blank 20 being turned by 45° at its rotational movement. A rotation of the stator blank by 135° in turn corresponds to a rotation of the tool 11 around the second shaft 13 by 270°. A further rotation of the stator blank 20 by a total of 180° coincides with a rotation of the tool 11 by 360°, such that the tool 11 assumes the centered position shown in FIG. 1c.

Figure 1A:
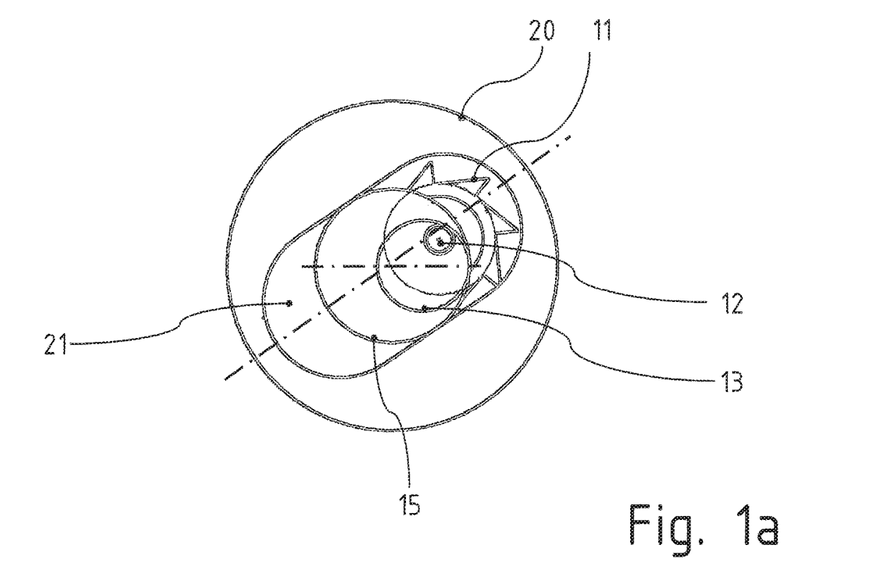
FIGS. 1a to FIG. 1d depict a method according to the invention for producing a cavity in a stator of an eccentric screw pump.
Figure 1B:
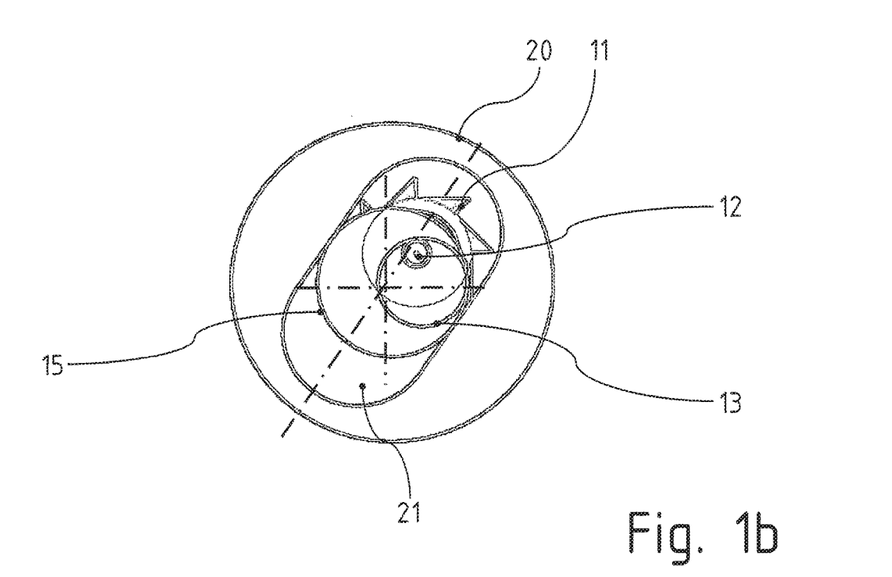
Figure 1C:
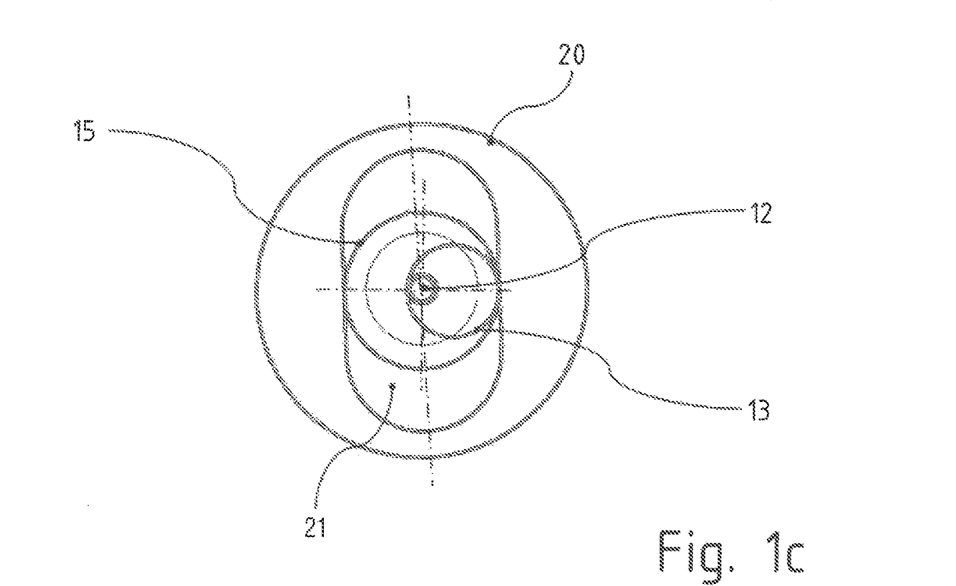
Figure 1D:
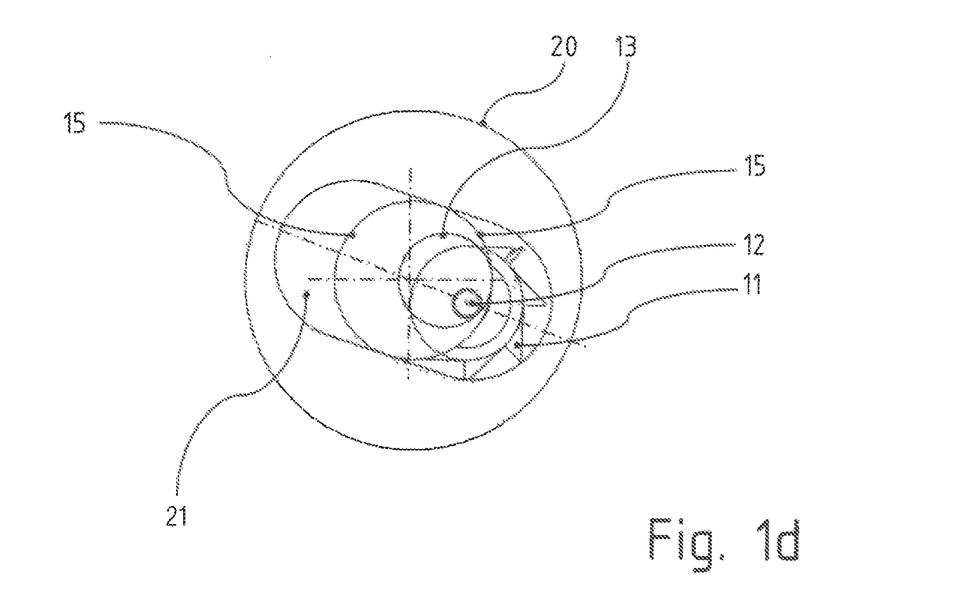

Additional coordinated states of movement between the stator blank 20 and the eccentrically moved milling tool 11 arise from the positions represented in FIG. 1d. FIG. 1d shows that the tool 11 has again moved on, which coincided with a new orientation of the stator blank.

The rotating movement of the stator blank 20 and the eccentric movement of the tool 11 are coordinated such that for a stator orientation of 360°, i.e., for a full rotation of the stator blank 20, the tool 11 is centered inside the stator blank 20, i.e., has carried out two full eccentric rotations of 360° each.

Through the interaction of the axial feed movement with the stator blank 20, as well as the rotating stator movement around the first shaft 12 and the eccentric stator movement around the second shaft 13 with a simultaneously set speed ratio between the stator blank 20 and the second shaft 13, the cavity 14 is formed in the stator blank 20 that corresponds to the helical progression of a rotor in an eccentric screw pump.

Figure 1E:
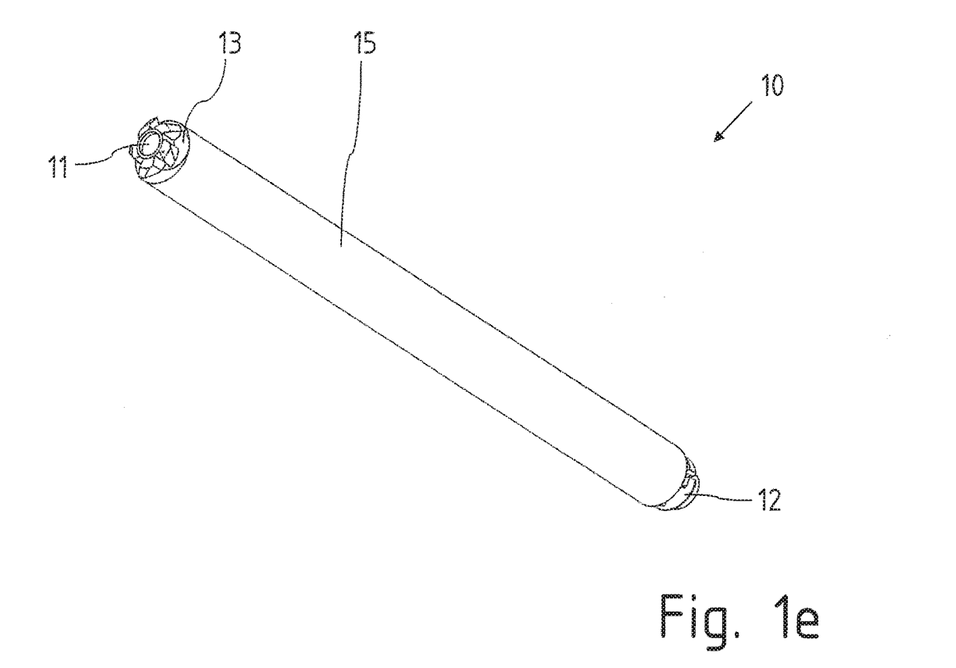
FIG. 1e is a perspective presentation of a first preferred embodiment of the device according to the invention.
Figure 2A:
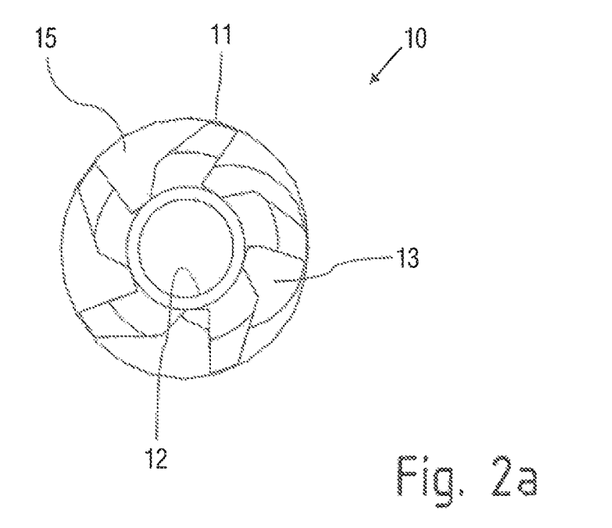
FIGS. 2a, 2b, 3a, 3b, 4a, 4b, 5a and 5b show different machining states of the device of 5b different machining states of the device according to the invention from FIG. 1e.
Figure 2B:
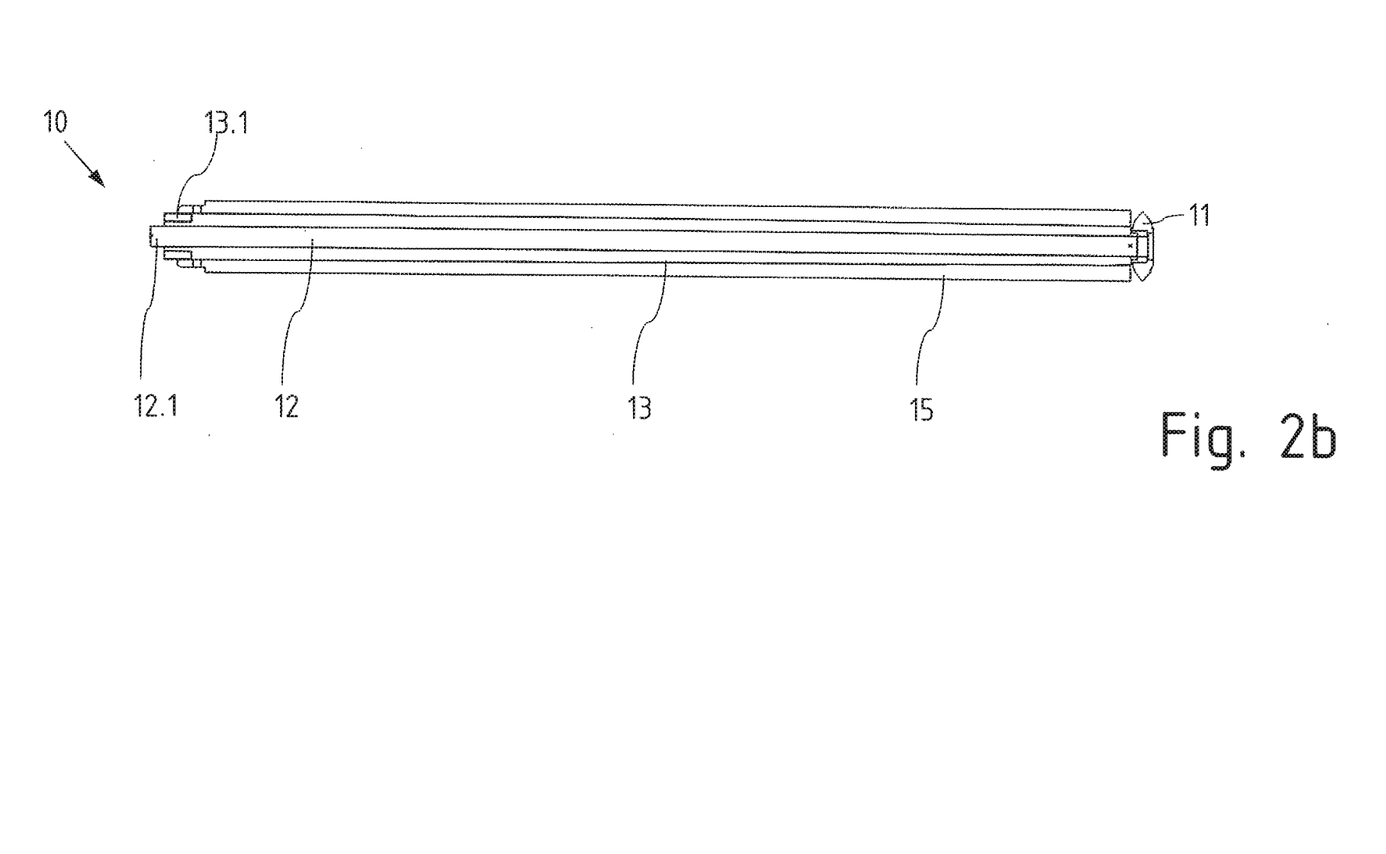

FIG. 2b shows a first exemplary embodiment for the device 10 according to the invention. The device 10 comprises an outer shaft 15 of an elongated shape that is equivalent and corresponds to the guide tube 15 in FIG. 1. It has a machining end shown on the right and a drive end shown on the left. A second (bearing) shaft 13 has a machining end which is seen on the right and a drive end 13.1 which is seen on the left. At the machining end of the second shaft 13, which corresponds to the second shaft 13 in FIG. 1, is a machining tool 11, which corresponds to the milling tool 11 in FIG. 1. It is arranged rotationally fixed. The second shaft 13 is form-fitting and arranged rotatably around its longitudinal axis in a borehole of the outer shaft 15, wherein the longitudinal axis of the second shaft 13 is arranged parallel and at a distance to the longitudinal axis of the outer shaft 15. The drive shaft 12, which corresponds to the first shaft 12 in FIG. 1, is form-fitting and arranged rotatably around its longitudinal axis in a borehole of the second shaft 13, wherein the longitudinal axis of the drive shaft 12 is arranged to intersect with the longitudinal axis of the second shaft 13.

The drive ends 12.1, 13.1 of shafts 12, 13 shown on the left are each constructed with a drive (not shown) for connection purposes by which the respective shaft can be transferred in rotation by its longitudinal axis. However, it is also possible that the drive ends of shafts 12, 13 are connected with at least one extension (not shown) that has three respective rotatable shafts, by which the length of the device 10 could be extended overall in order to be able to also machine cavities with greater axial lengths in the desired manner. This allows for the length of the device 10 to be adapted in a simple manner to various operating conditions. The drives are then connected to the free end of the shaft of the last extension according to the previous embodiment.

FIG. 2a shows a front view of the device 10 shown in FIG. 1e in a first machining state. In particular, the decentralized arrangement of the individual shafts 15, 13 and 12 relative to each other can be recognized. The machining tool 11, designed as a milling tool, has an effective diameter that is greater than the outer diameter of the second shaft 13. In the shown starting position of the device 10, the machining tool's 11 axis of rotation is essentially identical with the longitudinal axis of the outer shaft 15.

FIG. 2b shows a partially transparent side view of the embodiment shown in FIG. 2a, and of the device 10 shown in FIG. 1e in the machining position shown in FIG. 2a. This shows more clearly the arrangement of the shafts 15, 13 and 12 relative to each other. It is also apparent that the drive shaft 12 is form-fittingly received in the second (bearing) shaft 13 and the shaft 13 is form-fittingly received in the outer shaft 15.

Figure 3A:
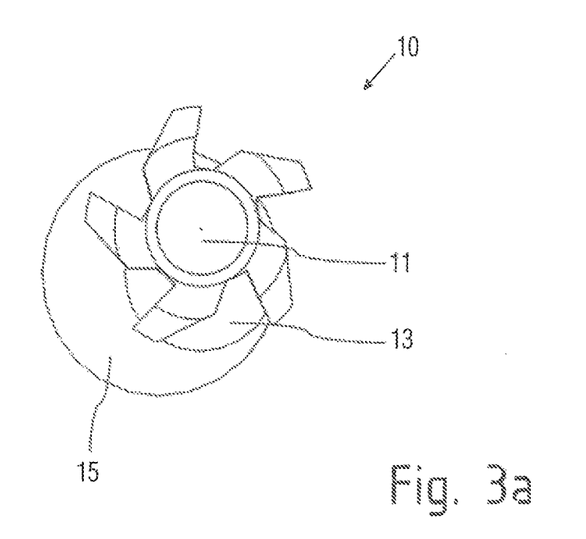

FIG. 3a shows a front view of the device 10 shown in FIG. 1 in a second machining state that arises from the first machining state shown in FIGS. 2a and 2b by a rotation of the second shaft 13 by 90° clockwise.

Figure 3B:
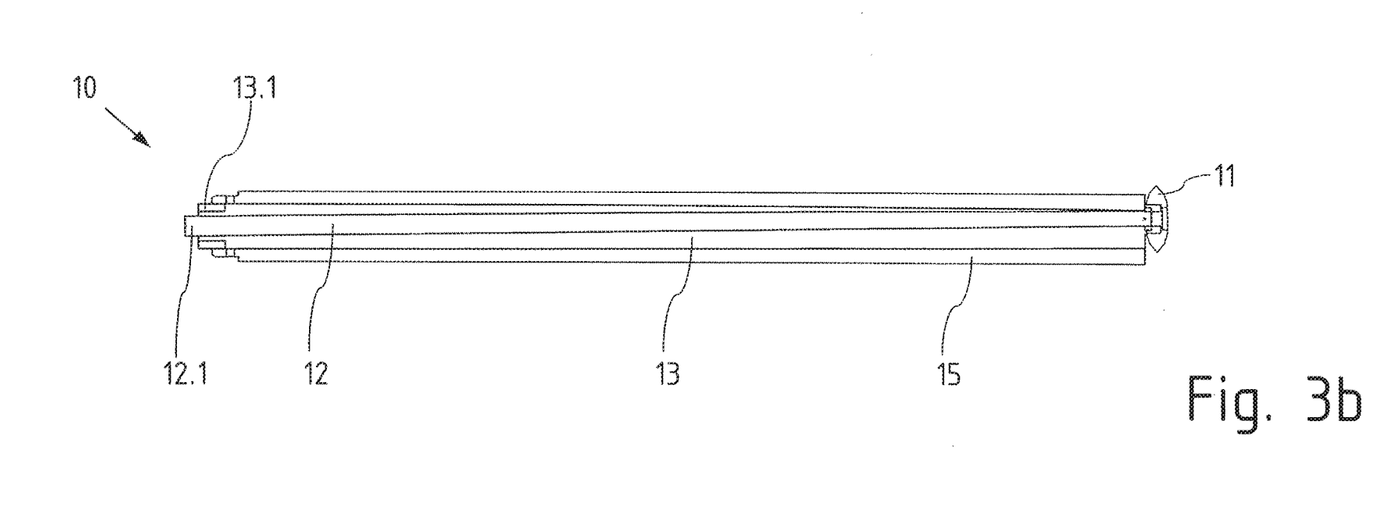

FIG. 3b shows a partially transparent side view of the device 10 shown in FIG. 3a and in FIG. 1e in the machining position shown in FIG. 3a. Here it is apparent that the drive shaft 12 is arranged relative to the second shaft 13 such that their longitudinal axes intersect. The drive end 12.1 of the drive shaft 12 shown on the left protrudes in the center from the drive end 13.1 of the second shaft 13, while the machining end of the drive shaft 12 shown on the right protrudes out of center from the machining end of the second shaft 13 shown on the right.

Figure 4A:
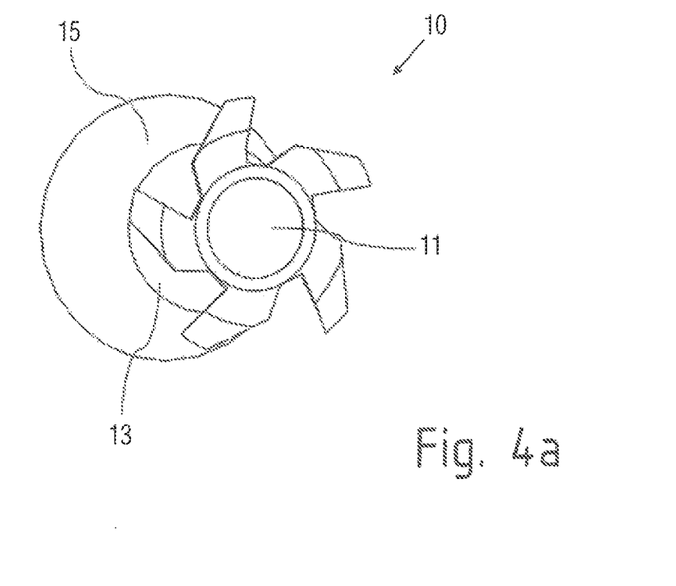

FIG. 4a shows a front view of the device 10 shown in FIG. 1e in a third machining state that arises from the second machining state shown in FIGS. 3a and 3b by a rotation of the second shaft 13 by 90° clockwise.

Figure 4B:
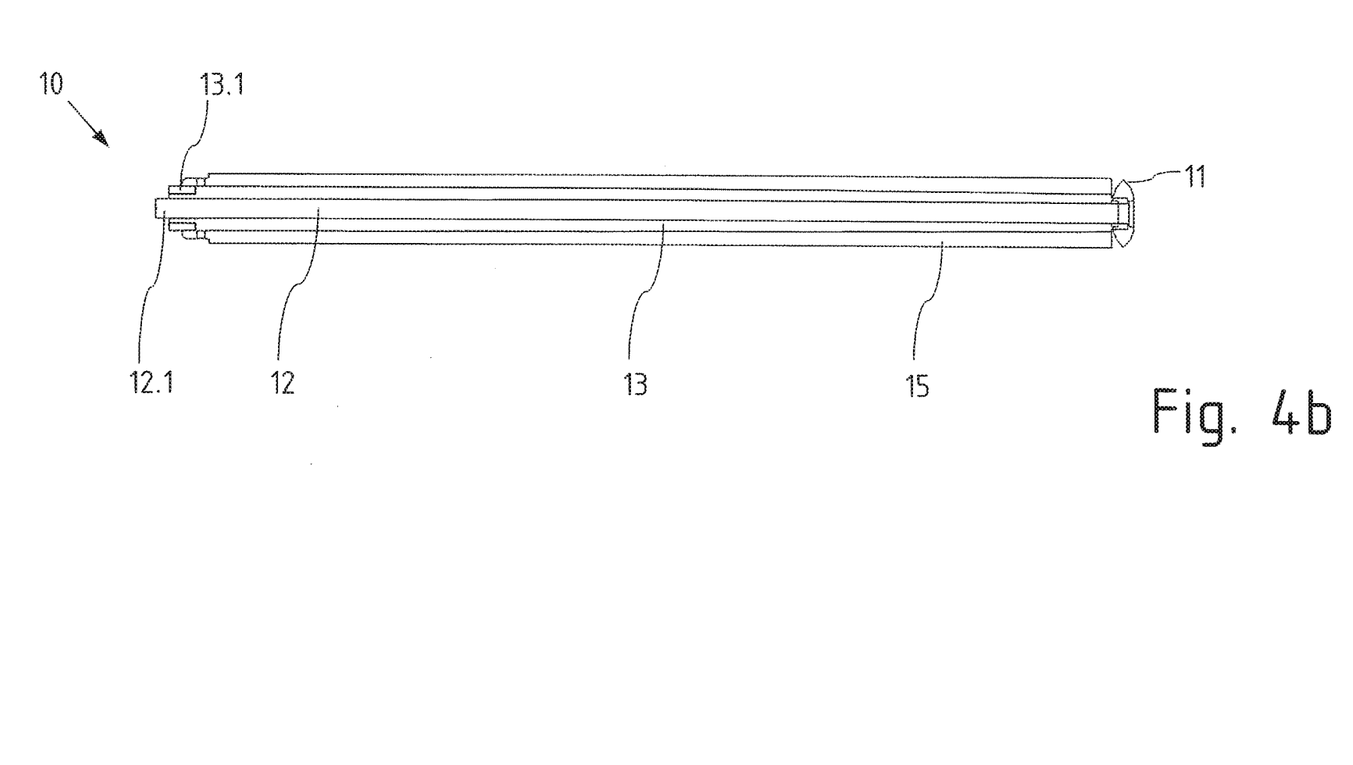

FIG. 4b shows a partially transparent side view of the device 10 shown in FIG. 4a and in FIG. 1e, in the machining position shown in FIG. 4a. The side view corresponds to that shown in FIG. 1b, because it cannot be recognized that the drive shaft 12 is arranged further away from the viewer, in particular at its machining end.

Figure 5A:
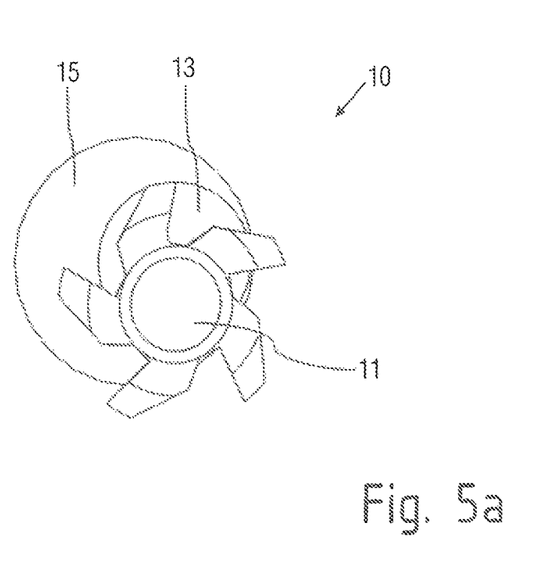

FIG. 5a shows a front view of the device 10 shown in FIG. 1e in a fourth machining state that arises from the third machining state shown in FIGS. 4a and 4b by a rotation of the second shaft 13 by 90° clockwise.

Figure 5B:
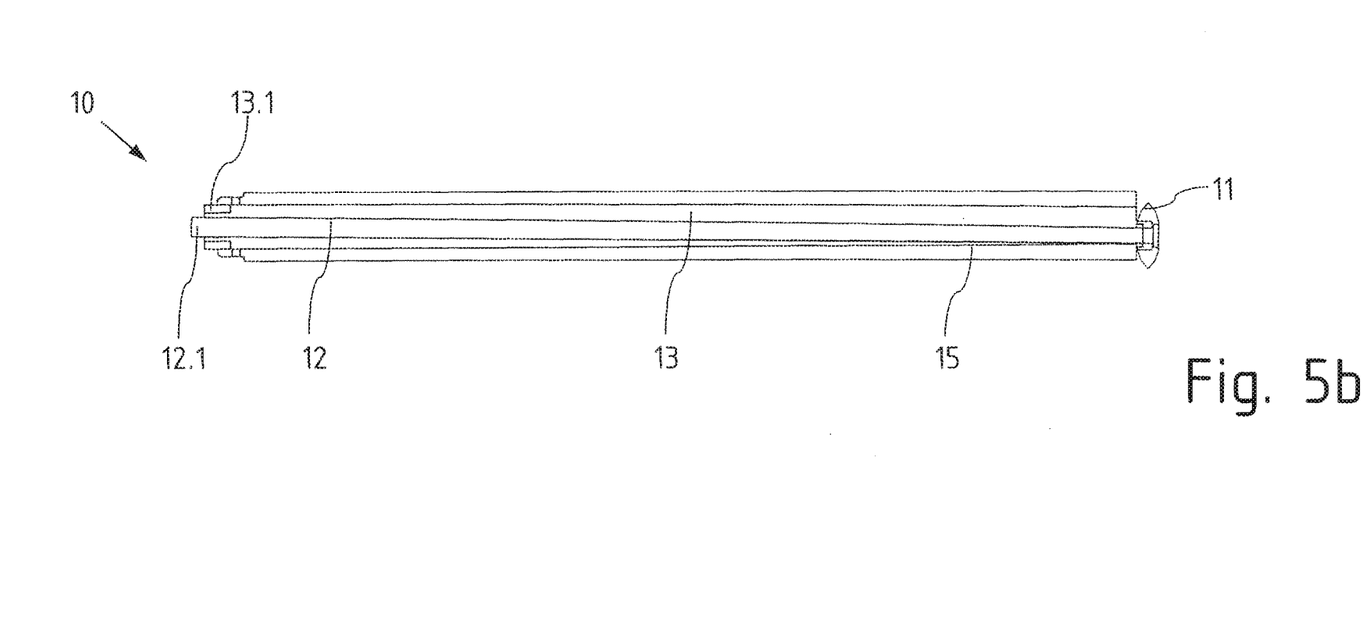

FIG. 5b shows a partially transparent side view of the device 10 shown in FIG. 5a and in FIG. 1e, in the machining position shown in Figure sa. FIG. 5b essentially corresponds to FIG. 3b; however, the bearing shaft 13 is shown in a position rotated by 180°, which has caused the drive shaft 12, and thus the machining tool 11, to be repositioned.

There has thus been shown and described a novel method and device for producing a cavity in a stator of an eccentric screw pump, which fulfill all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which be limited only by the claims which follow.

What is claimed is:

1. A method for producing a cavity in a stator of an eccentric screw pump, wherein a milling tool is used to remove material on the inside of a stator blank while the tool carries out a rotating movement inside the cavity driven by a first shaft as well as an eccentric movement around a second shaft, the improvement wherein:
   (a) the stator blank and the tool are moved against each other while the stator blank carries out a rotating movement,
   (b) the rotating and eccentric movements of the tool are carried out inside a non-rotating guide tube,
   (c) a speed ratio is sat between the stator blank and the second shaft,
   (d) at least one of the stator blank and the tool carry out an axial feed movement,
   (e) the tool is axially guided in the stator blank along the blank, and
   (f) the first shaft and the second shaft extend at an angle with respect to each other inside the guide tube.

2. Method as defined in claim 1, wherein the tool carries out at least two full eccentric movements during one full rotation of the stator blank.

3. Method as defined in claim 1, wherein the guide tube extends parallel to the second shaft.

4. A device for carrying out the method according to claim 1, comprising, in combination:
   (a) a bearing shaft that is rotatable around its longitudinal axis,
   (b) a drive shaft that is arranged in a borehole of the bearing shaft and is rotatable around its longitudinal axis relative to the bearing shaft, and
   (c) a machining tool, which is rotationally fixed to a machining end of the drive shaft and, when inserted into the cavity, it is driven rotatably about the longitudinal axis of the drive shaft;
   wherein the longitudinal axis of the drive shaft is arranged askew to the longitudinal axis of the bearing shaft; and
   wherein the axis of rotation of the machining tool runs through the outer shaft during a full rotation of the bearing shaft around its longitudinal axis.

5. The device as set forth in claim 4, wherein a drive end of the drive shaft protrudes at the center of the drive end of the bearing shaft and wherein the machining end of the drive shaft out of center from the machining end of the bearing shaft that is inserted into the cavity.

6. The device as set forth in claim 4, wherein the drive end of the drive shaft protrudes out of center from the drive end of the bearing shaft and wherein the machining and of the drive shaft protrudes from the center from the machining end of the bearing shaft and is inserted into the cavity.

7. The device as set forth in claim 4, wherein the drive shaft is arranged along its longitudinal axis, and is adjustable relative to the bearing shaft.

8. The device as set forth in claim 4, comprising an outer shaft, and wherein the bearing shaft is rotatable in a borehole in the outer shaft.

9. The device as set forth in claim 8, wherein the longitudinal axis of the bearing shaft is arranged parallel and at a distance to the longitudinal axis of the outer shaft, and wherein the outer shaft with its drive end is rotated about its longitudinal axis.

10. The device as set forth in claim 4, wherein the machining tool is a milling tool that has an effective diameter which is greater than the outer diameter of the bearing shaft.

* * * * *